(12) United States Patent
Chen

(10) Patent No.: US 6,913,100 B2
(45) Date of Patent: Jul. 5, 2005

(54) FUEL CONTAINER FOR ENGINE BICYCLES

(75) Inventor: Chien-Tai Chen, Taipei (TW)

(73) Assignee: McLee Co., Ltd., Taipei (TW)

( * ) Notice: Subject to any disclaimer, the term of this patent is extended or adjusted under 35 U.S.C. 154(b) by 0 days.

(21) Appl. No.: 10/724,733

(22) Filed: Dec. 2, 2003

(65) Prior Publication Data

US 2004/0108154 A1 Jun. 10, 2004

(30) Foreign Application Priority Data

Dec. 3, 2002 (TW) .................................. 91219578 U

(51) Int. Cl.$^7$ .............................................. B62D 61/02
(52) U.S. Cl. ...................................... 180/225; 280/831
(58) Field of Search ........................... 180/225; 280/831, 280/835

(56) References Cited

U.S. PATENT DOCUMENTS

| | | | | | |
|---|---|---|---|---|---|
| 1,308,602 | A | * | 7/1919 | Mennesson | 180/225 |
| 3,252,537 | A | * | 5/1966 | Tarran | 180/225 |
| 3,269,480 | A | * | 8/1966 | Kirby | 180/225 |
| 4,461,489 | A | * | 7/1984 | Tsukiji et al. | 280/835 |
| 4,951,774 | A | * | 8/1990 | Buell | 180/225 |
| 6,186,550 | B1 | * | 2/2001 | Horii et al. | 280/833 |

* cited by examiner

Primary Examiner—Kevin Hurley
(74) Attorney, Agent, or Firm—Birch, Stewart, Kolasch & Birch, LLP

(57) ABSTRACT

A fuel container for engine bicycles is formed by a selected section of a hollow frame of the engine bicycle. The fuel container has an inlet at the top end and an outlet at the bottom end thereof. The outlet is connected to a fuel line and has a drain port for discharging fuel.

3 Claims, 4 Drawing Sheets

FUEL CONTAINER FOR ENGINE BICYCLES

This Nonprovisional application claims priority under 35 U.S.C. § 119(a) on Patent Application No.(s). 091219578 filed in TAIWAN on Dec. 3, 2002, the entire contents of which are hereby incorporated by reference.

BACKGROUND OF THE INVENTION

1. Field of the Invention

The invention relates to a fuel container for engine bicycles that is directly formed from the bicycle frame.

2. Description of the Prior Art

With growing popularity of recreational activities, the bicycle that was a major transportation means in the past has become fashionable again. These days many people view the bicycle as a symbol of recreation. As there are many different types of recreational activities, the bicycle also has different designs to satisfy different users, such as the regular type for the general public, and the vigorous type for crossing rugged terrain.

While the bicycle can be used in all sorts of recreational sites, people power it, and people will feel fatigue from time to time. To have an alternative driving power would be desirable. Hence some vendors have introduced an external power asides from the traditional driving power for bicycle, such as electric driven bicycle and engine bicycle. Refer to FIGS. 1 and 2 for conventional engine bicycles. The bicycles 5 and 6 have an engine 3 mounting on the rear wheel as the driving source. As the bicycles 5 and 6 are originally designed with no other power source, the fuel tank for supplying fuel to the engine is mounted or hung in an added-on manner. Such as mounting a fuel tank 7 which looks like the one used on motorcycles on the bicycle frame 52 between the headset 50 and the seat 51 (referring to FIG. 1), or hanging and fastening a fuel tank 8 to a lower end of a passenger seat 60 (referring to FIG. 2). These two types are the commonly used arrangements for the fuel tank of the engine bicycles at present.

While the aforesaid fuel tank designs and mounting methods can provide fuel to drive the engine bicycle, by referring to FIGS. 1 and 2, the balanced factor for the bicycle is impaired. As the original structural design for the bicycle has included the consideration of weight balance at the front side and the rear side. In order to reduce weight and improve maneuverability, some bicycle frames even are made from aluminum alloy. With the fuel tank for other vehicles directly attached to the frame, the balance is destroyed. This is especially true when the fuel tank is not full and shaking occurs. In addition, the engine bicycle has acceleration effect which could make maneuvering of the bicycle difficult and result in risky situations. Moreover, attaching the fuel tank externally has to consider stability and concern of damage to the frame. While the external fuel tank could cause safety concern to the frame, it also impairs the aesthetic appearance and cannot achieve the appealing of integrated design. All these problems remained to be overcome.

SUMMARY OF THE INVENTION

In view of the aforesaid disadvantages, the present invention aims to provide a novel fuel tank that does not affect the balance of the existing bicycle frame or cause maneuvering risk, and adopts an integrated design with the frame without external attaching problem or compromising the aesthetic appealing. The fuel container according to the invention uses and modifies the bicycle hollow frame as the fuel container. Namely the hollow bracing tubes that have a larger size and are not coupled to other structures are modified to become the fuel container. The fuel container becomes a portion of the entire frame. Hence it does not alter the balance of the frame and does not cause risky maneuvering. In addition, the frame is redesigned to maintain the original appearance and aesthetic appealing. The problem of fastening the external fuel tank also is resolved. The fuel container according to the invention, like other fuel tank designs, includes an inlet located at the top end of the container and an outlet at the bottom end of the container. A seal cap to prevent external objects from entering covers the inlet. The outlet is connected to the engine through a duct.

By means of the aforesaid construction, any bicycle and engine bicycle frame that meets the conditions set forth above may become the fuel container of the invention. The fuel container is not limited to a single bracing tube. It may consist of a plurality of bracing tubes to form a fuel container of a greater capacity.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
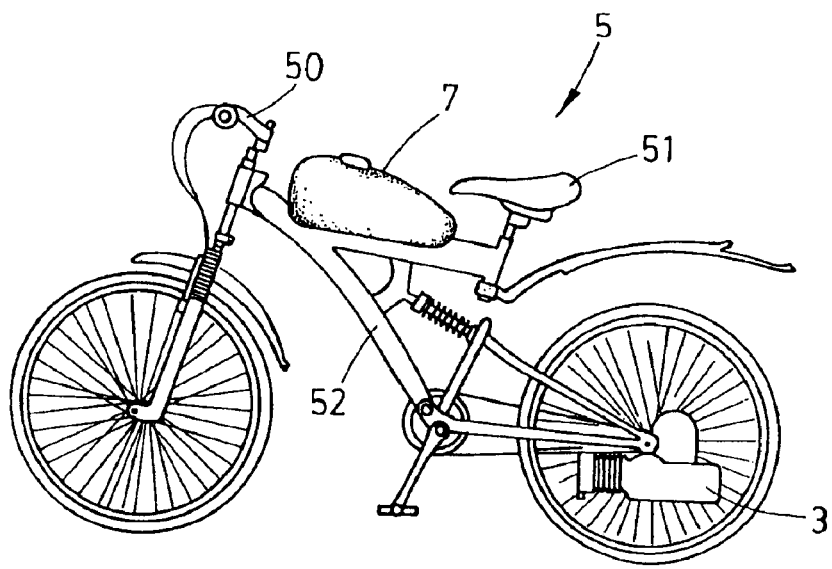
FIGS. 1 and 2 are schematic views of conventional engine bicycles showing fuel tank location.
Figure 2:
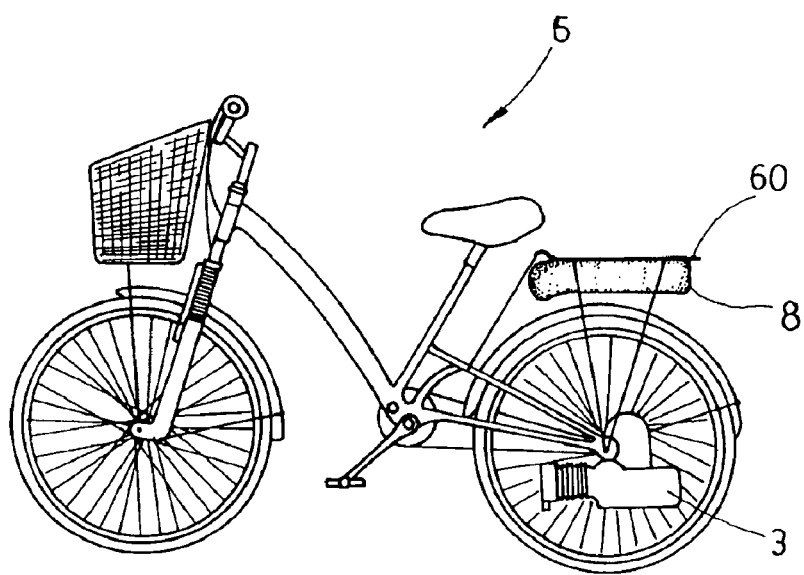
Figure 3:
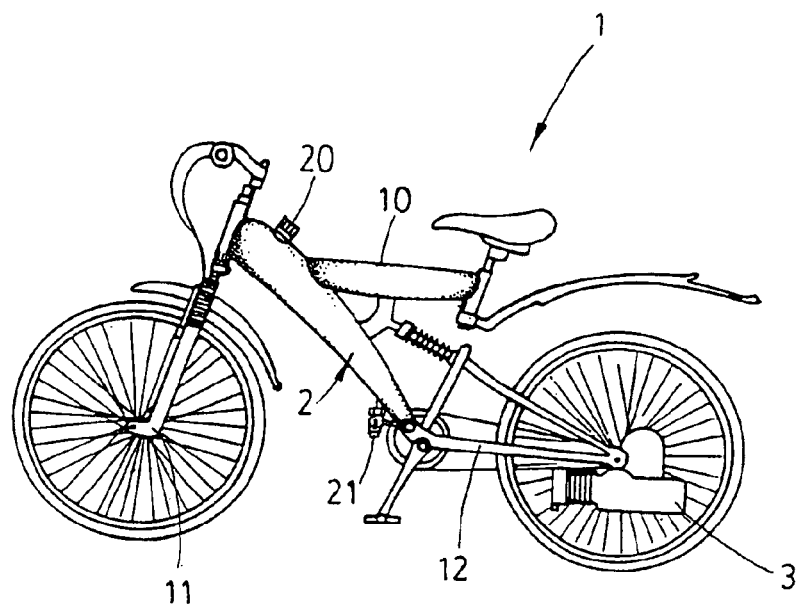
FIG. 3 is a schematic view of the invention coupling with a engine bicycle.
Figure 4:
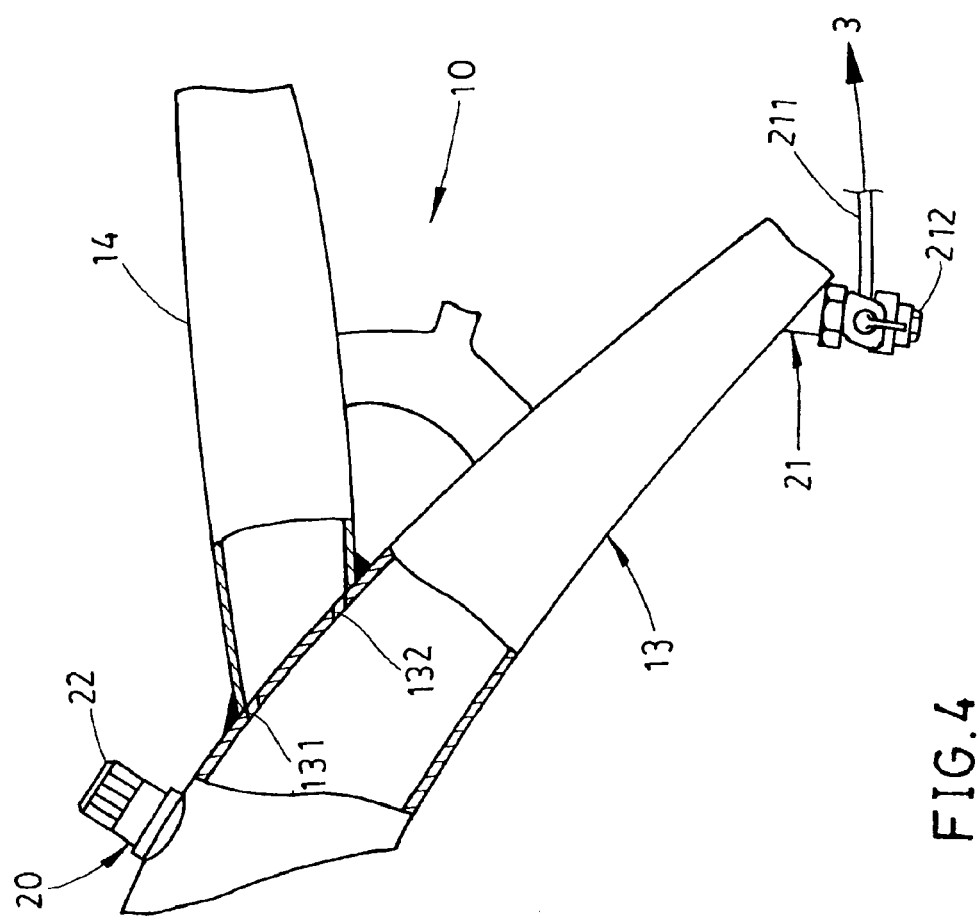

Refer to FIGS. 3 and 4 for an embodiment of the invention. The fuel tank for a engine bicycle 1 is located in a main frame 10 of the bicycle. The main frame 10 generally is a relatively larger frame located between a front fork 11 and a rear fork 12, and is a hollow tube. The main frame 10 in this embodiment includes a bracing tube 13 or two bracing tubes 13 and 14 that are coupled to become a fuel container 2 of the invention for the engine bicycle 1. The fuel container 2 has an inlet 20 located on the top end of the main frame 10 and covered by a screw cap 22, and an outlet 21 close to the bottom end of the main frame 10. The outlet 21 has a bottom end sealed by a drain nut 212 and is transversely connected to a fuel duct 211 at an upper location. The fuel duct 211 transports the fuel from the fuel container 2 to an engine 3. The drain nut 212 is for discharging impurities deposited on the bottom of the fuel container 2.

Figure 5:
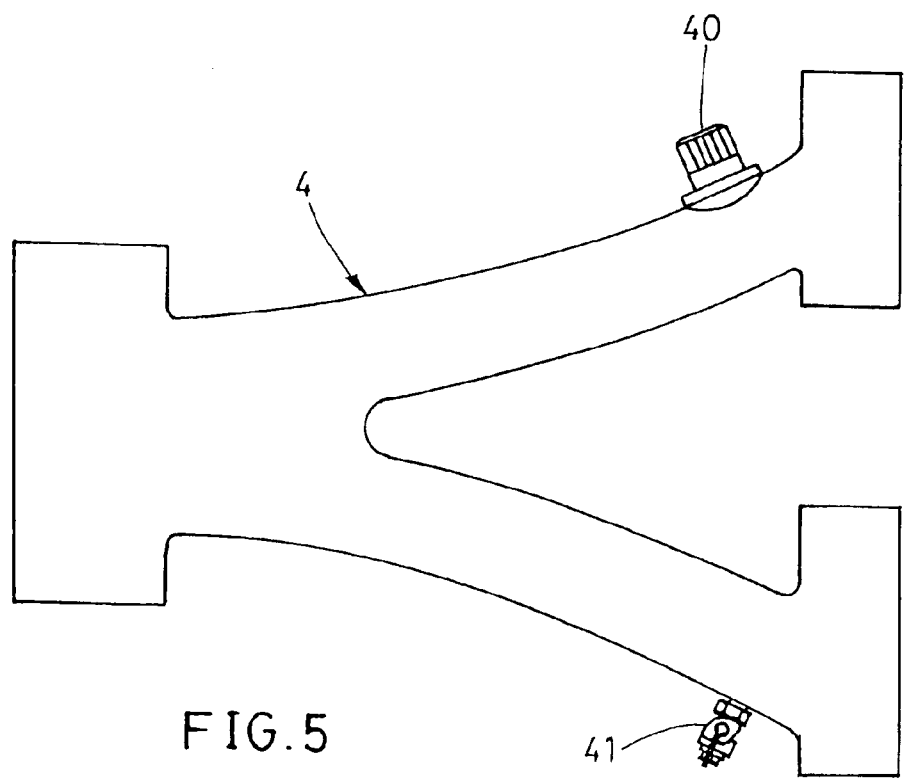
FIGS. 4 and 5 are schematic views of two other embodiments according to the invention.

Referring to FIGS. 4 and 5, the fuel container 2 consists of one bracing tube of the main frame 10. It may also consist of two bracing tubes to increase fuel capacity. For the fuel container consisting of two bracing tubes as shown in FIG. 4, the juncture of the first bracing tube 13 and the second bracing tube 14 has an air vent 131 at an upper location and a fuel port 132 at a lower location. In order to smooth fuel flow, the second bracing tube 14 is slightly inclined towards the direction of the first bracing tube 13 so that fuel can flow naturally into the first bracing tube 13 and flows out through the fuel duct 211. Refer to FIG. 5 for another type of fuel container 4. It is a fork type frame fabricated integrally without soldering. The frame becomes the fuel container 4. As previously discussed shown in FIG. 3, it also has an inlet 40 located at an upper location and an outlet 41 at a lower location. As the frame is made in an integrated manner and has an inner space communicates freely, it does not need a vent or port to facilitate fuel flowing.

Figure 6:
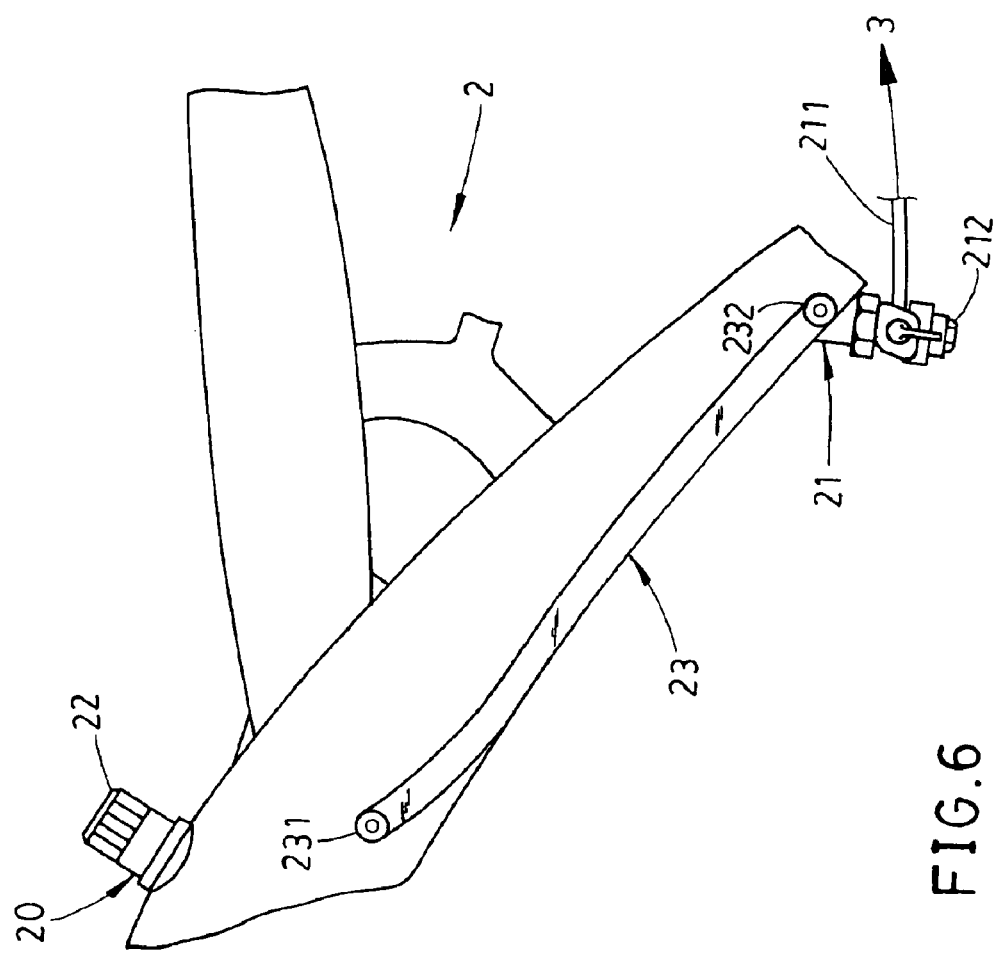
FIG. 6 is a schematic view of the invention coupling with a clear fuel line externally.

Refer to FIG. 6 for another structure according to the invention that includes a clear fuel line 23. The fuel line 23 has one end 231 adjacent to a lower side of the inlet 20 and another end 232 adjacent to the outlet 21, and is positioned in an inclined manner. The fuel line 23 is preferably located close to the bottom side of the fuel container 2 to indicate the actual fuel content remains in the fuel container 2 so that users can see the fuel content condition from outside of the fuel container 2.

By means of the aforesaid construction, it is clear that the existing bicycle frame forms the fuel container according to the invention. It is to be noted that the shape of the fuel container is not limited to the ones indicated in the aforesaid embodiments. The bicycle frames for different purposes may become fuel containers of different shapes. Moreover, other bracing tubes rather than the main frame may also form the fuel container as long as it is acceptable structure-wise and the fuel can flow smoothly.

I claim:

1. A fuel container for engine bicycles comprising a selected section of a hollow frame to form a space for containing fuel, the fuel container having an inlet at an upper end sealed by a cap and an outlet close to a bottom end thereof and having a clear fuel line located outside the fuel container.

2. The fuel container of claim 1, wherein the outlet is connected to a fuel duct at an upper end and has a drain port at a bottom end thereof.

3. The fuel container of claim 1, wherein the clear fuel line is inclined from the neighborhood of the cap to the outlet.

* * * * *